(12) United States Patent
Koito et al.

(10) Patent No.: US 9,787,973 B2
(45) Date of Patent: Oct. 10, 2017

(54) DISPLAY DEVICE AND ELECTRONIC DEVICE

(71) Applicant: Japan Display Inc., Minato-ku (JP)

(72) Inventors: Takeo Koito, Minato-ku (JP); Yingbao Yang, Minato-ku (JP); Amane Higashi, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 105 days.

(21) Appl. No.: 14/858,358

(22) Filed: Sep. 18, 2015

(65) Prior Publication Data

US 2016/0094838 A1    Mar. 31, 2016

(30) Foreign Application Priority Data

Sep. 29, 2014 (JP) ................................. 2014-197852

(51) Int. Cl.
*G02F 1/1335* (2006.01)
*H04N 13/04* (2006.01)

(52) U.S. Cl.
CPC ..... *H04N 13/0409* (2013.01); *H04N 13/0477* (2013.01)

(58) Field of Classification Search
CPC .................. H04N 13/0477; H04N 13/0409
USPC .......................................................... 349/15
See application file for complete search history.

(56) References Cited

U.S. PATENT DOCUMENTS

| | | | | |
|---|---|---|---|---|
| 8,687,132 B2 * | 4/2014 | Nakayama | ............... | B32B 37/02 349/15 |
| 8,723,920 B1 * | 5/2014 | Hoppenstein | ...... | H04N 13/0413 345/419 |
| 8,848,040 B2 * | 9/2014 | Lo | ....................... | G02B 27/2214 348/42 |
| 2012/0038634 A1 * | 2/2012 | Cha | .................... | H04N 13/0404 345/419 |
| 2013/0335385 A1 * | 12/2013 | Kim | ................... | H04N 13/0409 345/204 |

FOREIGN PATENT DOCUMENTS

JP     2013-024957     2/2013

* cited by examiner

*Primary Examiner* — Hoan C Nguyen
(74) *Attorney, Agent, or Firm* — Oblon, McClelland, Maier & Neustadt, L.L.P.

(57) ABSTRACT

According to one embodiment, a display device includes a switching liquid crystal unit, a display, and a controller. The switching liquid crystal unit includes optical elements switching an aperture pattern including an aperture portion and a light-shielding portion. The display overlaps the switching liquid crystal unit and displays parallax images including right and left eye images. The controller acquires positional information relating to a position of a viewer, and controls a position of the aperture pattern. The controller switches the aperture pattern from a first aperture pattern to a second aperture pattern so that a right eye always views the right eye image and a left eye always views the left eye image, and starts the switching before the viewer moves to an optimal switching position where a luminance viewed from the first aperture pattern is substantially equal to a luminance viewed from the second aperture patterns.

12 Claims, 8 Drawing Sheets

DISPLAY DEVICE AND ELECTRONIC DEVICE

CROSS-REFERENCE TO RELATED APPLICATIONS

This application is based upon and claims the benefit of priority from Japanese Patent Application No. 2014-197852, filed on Sep. 29, 2014; the entire contents of which are incorporated herein by reference.

FIELD

Embodiments described herein relate generally to a display device and an electronic device.

BACKGROUND

There is a display device in which a stereoscopic image is viewable by naked eyes. For example, there is a parallax barrier-type display device that uses an optical element such as a liquid crystal element, etc. An appropriate image is provided according to the position of the viewer by employing head tracking technology. It is desirable to improve the ease of viewing of the display device.

SUMMARY OF THE INVENTION

According to one embodiment, a display device includes a switching liquid crystal unit, a display, and a controller. The switching liquid crystal unit switches an aperture pattern by a plurality of optical elements. The aperture pattern includes an aperture portion and a light-shielding portion. The aperture portion is in a light-transmitting state. A transmittance of the light-shielding portion is lower than a transmittance in the light-transmitting state. The display overlaps the switching liquid crystal unit and displays parallax images including a right eye image and a left eye image. The controller acquires positional information relating to a position of a viewer, and controls a position of the aperture pattern based on the positional information. The controller switches the aperture pattern from a first aperture pattern to a second aperture pattern so that a right eye of the viewer always views the right eye image and a left eye of the viewer always views the left eye image when the viewer moves with respect to the display. The controller starts the switching before the viewer moves to an optimal switching position. The optimal switching position is the position of the viewer where a luminance viewed from the first aperture pattern is substantially equal to a luminance viewed from the second aperture pattern.

According to another embodiment, a display device includes a switching liquid crystal unit, a display, and a controller. The switching liquid crystal unit switches a display image pattern by a plurality of optical elements. The display image pattern includes an aperture portion and a light-shielding portion. The aperture portion is in a light-transmitting state. A transmittance of the light-shielding portion is lower than a transmittance in the light-transmitting state. The display overlaps the switching liquid crystal unit, and displays parallax images including a right eye image and a left eye image. The controller acquires positional information relating to a position of a viewer, and controls the display image pattern of the right eye image and the left eye image based on the positional information. The controller switches the display image pattern from a first display image pattern to a second display image pattern so that a right eye of the viewer always views the right eye image and a left eye of the viewer always views the left eye image when the viewer moves with respect to the display. The controller starts the switching before the viewer moves to an optimal switching position. The optimal switching position is the position of the viewer where a luminance viewed from the first display image pattern is substantially equal to a luminance viewed from the second display image pattern.

According to another embodiment, an electronic device includes a display device. The display device includes a switching liquid crystal unit, a display, and a controller. The switching liquid crystal unit switches an aperture pattern by a plurality of optical elements. The aperture pattern includes an aperture portion and a light-shielding portion. The aperture portion is in a light-transmitting state. A transmittance of the light-shielding portion is lower than a transmittance in the light-transmitting state. The display overlaps the switching liquid crystal unit and displays parallax images including a right eye image and a left eye image. The controller acquires positional information relating to a position of a viewer and controls the position of the aperture pattern based on the positional information. The controller switches the aperture pattern from a first aperture pattern to a second aperture pattern so that a right eye of the viewer always views the right eye image and a left eye of the viewer always views the left eye image when the viewer moves with respect to the display. The controller starts the switching before the viewer moves to an optimal switching position. The optimal switching position is the position of the viewer where a luminance viewed from the first aperture pattern is substantially equal to a luminance viewed from the second aperture pattern.

DETAILED DESCRIPTION

Various Embodiments will be described hereinafter with reference to the accompanying drawings.

The disclosure is but an example; and appropriate modifications within the spirit of the invention will be readily apparent to one skilled in the art and naturally are within the scope of the invention. Moreover, although the widths, thicknesses, configurations, etc., of components in the drawings may be illustrated schematically compared to the actual embodiments for better clarification of description, these are merely examples and do not limit the construction of the invention.

In the specification, components similar to those described in regard to a drawing thereinabove are marked with like reference numerals, and a detailed description may be omitted as appropriate.

First Embodiment

Figure 1:
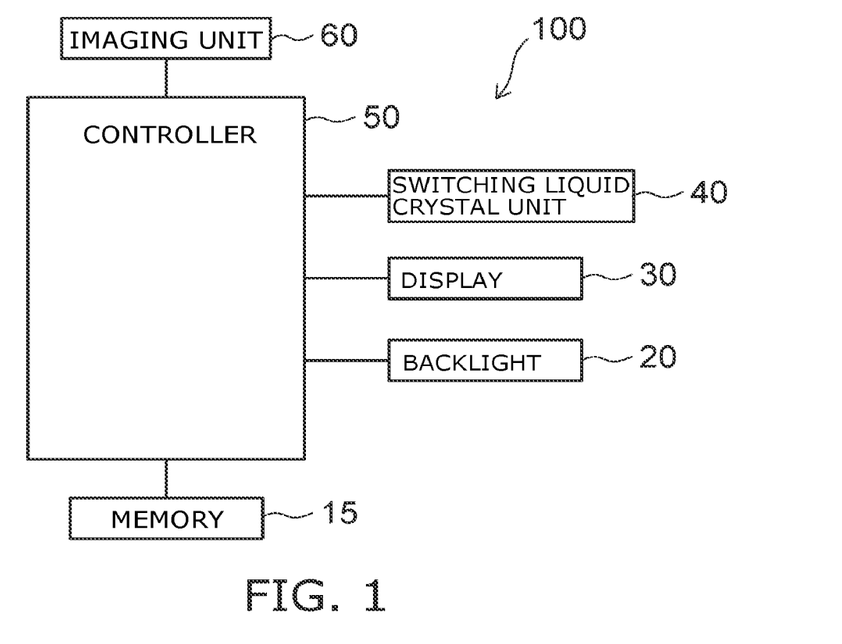
FIG. 1 is a block diagram illustrating a display device according to the first embodiment.

FIG. 1 is a block diagram illustrating a display device according to the first embodiment in which a parallax stereoscopic image is viewable.

For example, memory 15, a backlight 20, a display 30, a switching liquid crystal unit 40, a controller 50, and an imaging unit 60 are provided in the display device 100. The switching liquid crystal unit 40 includes, for example, a parallax barrier using a liquid crystal. The parallax barrier is a switching liquid crystal which is an optical switch in which it is possible to switch to a transmitting state or a light-shielding state; and the switching liquid crystal is not limited to a parallax barrier and may be a lenticular lens, etc.

The controller 50 includes, for example, a CPU (Central Processing Unit), RAM (Random Access Memory), and ROM (Read Only Memory). The controller 50 controls the operations of the display 30, the switching liquid crystal unit 40, and the backlight 20. The controller 50 supplies a display control signal to the display 30. For example, the controller 50 calculates the position of a viewer imaged by the imaging unit 60 and controls the position of the aperture portion of the switching liquid crystal unit 40 according to the position of the viewer. The aperture portion is a light-transmitting region (a region in the light-transmitting state). The switching liquid crystal unit 40 is controlled in cooperation with the operation of the display 30 so that the switching liquid crystal unit 40 makes a stereoscopic image viewable to the naked eyes. The controller 50 also can control the luminance of the backlight 20 based on an image signal supplied from the outside.

The backlight 20 emits light toward the display 30. The light source of the backlight 20 includes, for example, an LED (Light Emitting Diode). A CCFL (Cold Cathode Fluorescent Lamp) may be used as the light source of the backlight 20.

The switching liquid crystal unit 40 includes multiple light-shielding regions (a non light-transmitting state having a transmittance lower than that of the light-transmitting state) and multiple light-transmitting regions (regions in the light-transmitting state) so that each pixel in the interior of the display 30 can be viewed only by the right eye or the left eye that corresponds to the pixel; and the switching liquid crystal unit 40 has a configuration in which it is possible to switch the multiple light-shielding regions and the multiple light-transmitting regions according to the position of the viewer. The switching liquid crystal unit 40 is, for example, a liquid crystal barrier using a liquid crystal as the optical element. The switching liquid crystal unit 40 operates according to the position of the viewer. The switching liquid crystal unit 40 includes multiple optical elements; electrodes are provided at each of the optical elements; and the arrangement of the liquid crystal molecules between the electrodes is controlled by modifying the voltage applied to the electrodes. Thereby, the light-shielding regions and the light-transmitting regions are switched according to the change of the position of the viewer. An example of the optical element is described below.

The display 30 causes the light-transmitting portions and the light-shielding portions included in the switching liquid crystal unit 40 and the corresponding positions of the pixels to overlap. Specifically, the overlap of the light-shielding regions and the light-transmitting regions of the switching liquid crystal unit 40 and the pixels that display the image for the right eye cause these pixels to be viewed only by the right eye. The overlap of the light-shielding regions and the light-transmitting regions of the switching liquid crystal unit 40 and the pixels that display the image for the left eye cause these pixels to be viewed only by the left eye. The display 30 emits display light including parallax images. For example, a liquid crystal display (LCD) is used as the display 30. The display 30 performs the display by the liquid crystal display element modulating the light emitted from the backlight 20. An organic EL display (Organic Electro Luminescence Display (OELD)) may be used as the display 30.

The imaging unit 60 includes, for example, an imaging element such as a CCD (Charge Coupled Device), etc. The imaging unit 60 images the viewer viewing the display of the display device 100 and acquires an image of the viewer. The controller 50 calculates the position (the angle) of the viewer based on the image acquired by the imaging unit 60. The display device 100 may have a face recognition function of recognizing the face of the viewer. Thereby, the designation of the viewer inside the image is easy.

For example, the relative angle between the viewer and the display device 100 may be used as the position of the viewer. For example, the angle between the viewer and a normal of the display screen of the display device 100 at a reference point of the display screen may be used as the position of the viewer. The distance between the reference point of the display screen and the point of the position of the viewer projected onto a plane including the display screen may be used as the position of the viewer.

For example, nonvolatile memory such as EEPROM (Electrically Erasable Programmable Read-Only Memory) or the like is used as the memory 15. Data, programs, etc., that are necessary for the control of the display device 100 are stored in the memory 15.

Figure 2:
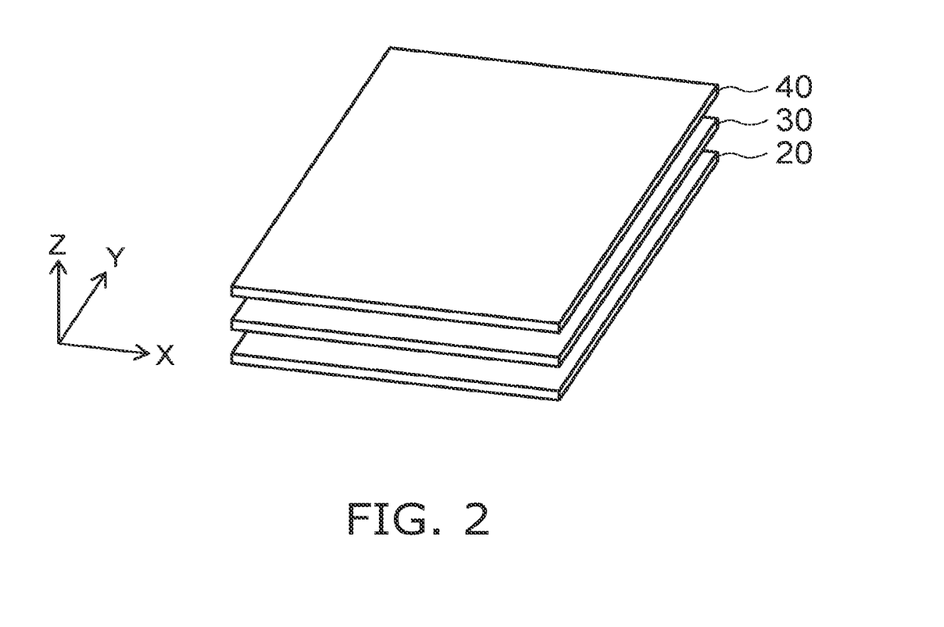
FIG. 2 is a schematic cross-sectional view illustrating a portion of the display device according to the first embodiment.

FIG. 2 is a schematic cross-sectional view illustrating a portion of the display device according to the first embodiment.

FIG. 2 illustrates the backlight 20, the display 30, and the switching liquid crystal unit 40.

In the example, the switching liquid crystal unit 40, the display 30, and the backlight 20 overlap in this order. The light that is emitted from the backlight 20 reaches the viewer via the display 30 and the switching liquid crystal unit 40. The display 30, the switching liquid crystal unit 40, and the backlight 20 may overlap in this order.

Figure 3:
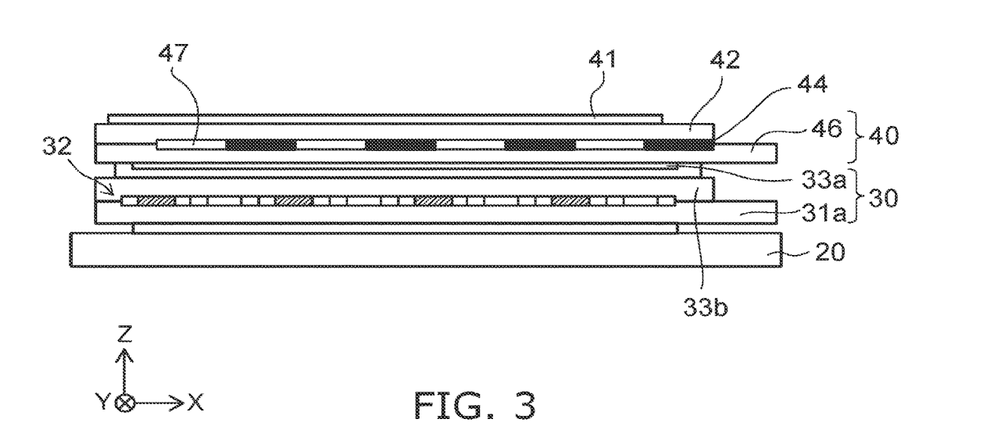
FIG. 3 is a schematic cross-sectional view illustrating a portion of the display device according to the first embodiment.

FIG. 3 is a schematic cross-sectional view illustrating a portion of the display device according to the first embodiment.

FIG. 3 illustrates the backlight 20, the display 30, and the switching liquid crystal unit 40.

Although not particularly limited, the display 30 includes, for example, a liquid crystal layer 32 provided between a TFT (Thin Film Transistor) substrate 31a and a counter substrate 33b, and alignment films provided at the surfaces contacting the liquid crystal layer 32. The multiple electrode pairs for controlling the arrangement of the liquid crystal molecules may be provided at the TFT substrate 31a and the counter substrate 33b or may be provided only at the TFT substrate 31a according to the mode of the liquid crystal.

Although not particularly limited, the switching liquid crystal unit 40 includes, for example, a first substrate 42 provided between a polarizing plate 41 and a polarizing plate 33a. A second substrate 46 is provided between the polarizing plate 33a and the first substrate 42. A liquid crystal layer 44 is provided between the first substrate 42 and the second substrate 46; and the alignment films are provided at the surfaces contacting the liquid crystal layer 44. The multiple electrode pairs for driving the liquid crystal layer 44 may be provided at the second substrate 46 and the first substrate 42 or may be provided only at the second substrate 46 according to the mode of the liquid crystal. Thus, multiple optical elements 47 are formed by providing the multiple transparent electrode pairs; and the switching liquid crystal is formed by selectively causing the multiple optical elements 47 to transmit or non-transmit.

Figure 4:
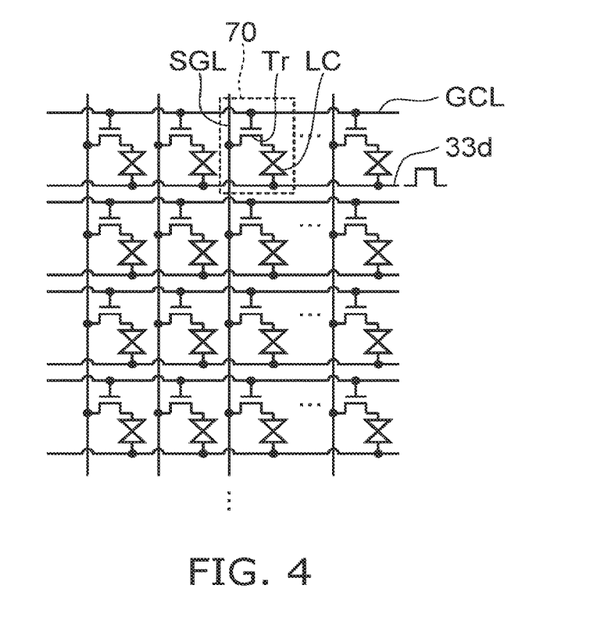
FIG. 4 is a circuit diagram illustrating a portion of the display device according to the first embodiment.

FIG. 4 is a circuit diagram illustrating a portion of the display device according to the first embodiment.

FIG. 4 illustrates a circuit of the pixels of the display 30.

The pixel 70 includes a TFT element Tr and a liquid crystal element LC. The TFT element Tr is, for example, a MOS-FET (Metal Oxide Semiconductor Field Effect Transistor). The gate of the TFT element Tr is connected to a scanning line GCL. The source of the TFT element Tr is connected to a pixel signal line SGL. One end of the liquid crystal element LC is connected to the drain of the TFT element Tr. The other end of the liquid crystal element LC is connected to a counter electrode 33d.

Figure 5A:
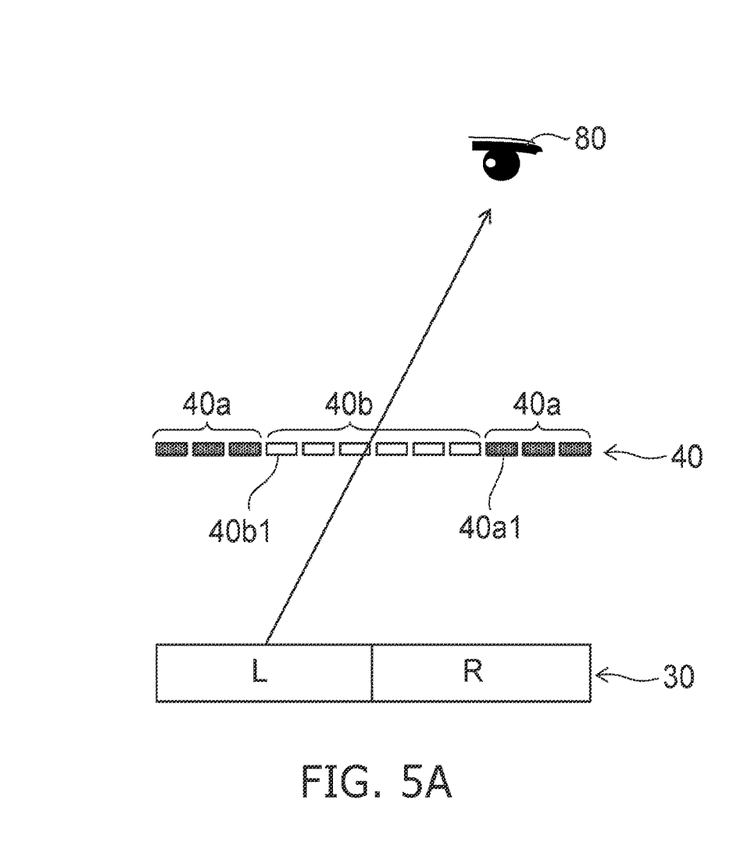
FIG. 5A and FIG. 5B are schematic views illustrating an operation of the display device according to the first embodiment.
Figure 5B:
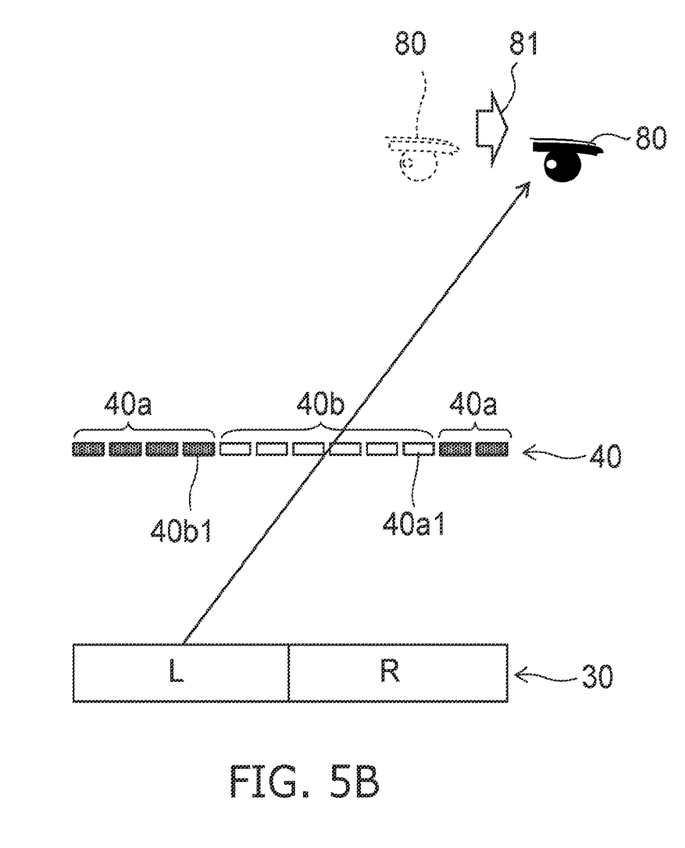

FIG. 5A and FIG. 5B are schematic views illustrating an operation of a head tracking 3D display device using the switching liquid crystal according to the first embodiment.

These drawings illustrate the head tracking operation of the switching liquid crystal unit 40.

For example, a left eye pixel L that displays a left eye image and a right eye pixel R that displays a right eye image are arranged alternately in the display 30.

The switching liquid crystal unit 40 includes a light-shielding region 40a that includes the multiple optical elements 47 in the non light-transmitting state and a light-transmitting region 40b that includes the multiple optical elements 47 in the light-transmitting state. In the case where one pixel for the right eye is taken as R, and one pixel for the left eye is taken as L, "LRLR" has "LR" as one period. "LLRRLLRR" has "LLRR" as one period. "LRLR" means that the pixel for the right eye and the pixel for the left eye are continuous alternately. "LLRRLLRR" means that the pixel for the right eye and the pixel for the left eye are continuous alternately two by two. It is favorable for the number of optical elements 47 provided in the light-transmitting region 40b to be 3 or more. Thereby, fine movement is possible; and a natural display can be implemented.

As shown in FIG. 5A, the light-shielding region 40a and the light-transmitting region 40b are formed in the switching liquid crystal unit 40. According to the arrangement, the left eye of a viewer 80 can view the left eye pixel L of the display 30 but cannot view the right eye pixel R. Similarly, due to the switching liquid crystal unit 40, the right eye can view the right eye pixel R but cannot view the left eye pixel L. The position of the light-shielding region 40a and the position of the light-transmitting region 40b change according to the movement of the viewer 80. In the example of FIG. 5A, at least one optical element 40b1 is included in the light-transmitting region 40b; and at least one optical element 40a1 is included in the light-shielding region 40a.

As shown in FIG. 5B, the left eye of the viewer 80 moves in the direction of an arrow 81 in the drawing due to the movement of the viewer 80. At this time, the multiple optical elements 47 included in the switching liquid crystal unit 40 are controlled so that the left eye of the viewer 80 can view the left eye pixel L of the display 30 and cannot view the right eye pixel R; and the positions of the light-shielding region 40a and the light-transmitting region 40b are switched according to the movement of the viewer 80. The optical element 40b1 is in the light-transmitting state in FIG. 5A; and according to the movement of the viewer 80, the optical element 40b1 is modified to the non light-transmitting state as in FIG. 5B. The optical element 40a1 is in the non light-transmitting state in FIG. 5A; and according to the movement of the viewer 80, the optical element 40a1 is modified to the light-transmitting state as in FIG. 5B.

The controller 50 acquires information relating to the position of the viewer 80 (the image of the viewer 80) using the imaging unit 60 and switches each of the multiple optical elements 47 included in the switching liquid crystal unit 40 to the light-transmitting state or the non light-transmitting state based on the acquired information. Thereby, in the case where the position of the viewer 80 moves, the viewer 80 can appropriately perceive stereoscopic vision.

Figure 6A:
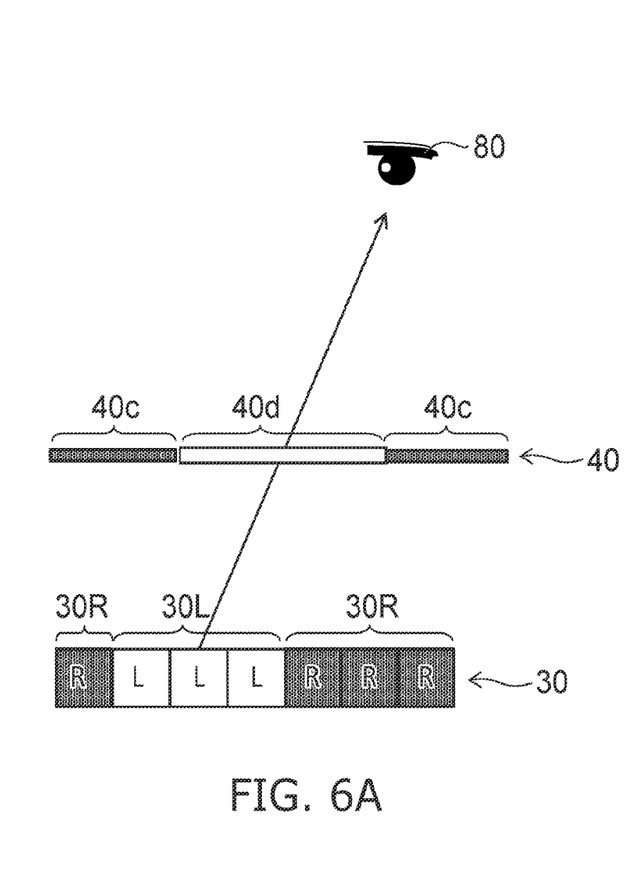
FIG. 6A and FIG. 6B are schematic views illustrating an operation of the display device.
Figure 6B:
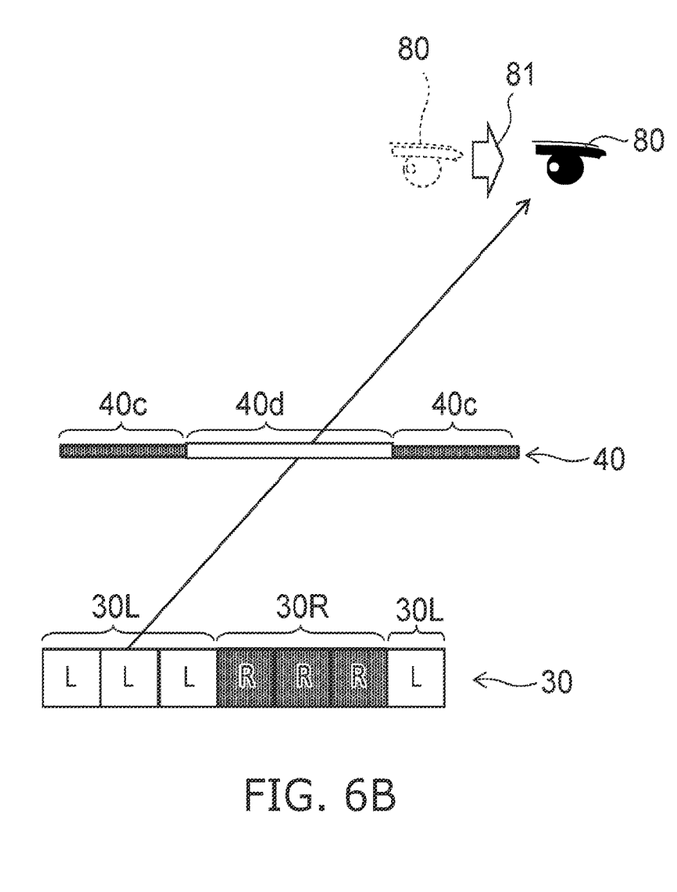

FIG. 6A and FIG. 6B are schematic views illustrating an operation of a head tracking 3D display device controlling the pixels of the display.

These drawings illustrate the image shift operation of the display 30.

In the display 30, a left eye pixel region 30L that displays the left eye image and a right eye pixel region 30R that displays the right eye image are arranged alternately. In the example, the left eye pixel region 30L includes three left eye pixels L; and the right eye pixel region 30R includes three right eye pixels R. The switching liquid crystal unit 40 includes a light-shielding region 40c that includes multiple optical elements in the non light-transmitting state and a light-transmitting region 40d that includes multiple optical elements in the light-transmitting state.

As shown in FIG. 6A, the light-shielding region 40c and the light-transmitting region 40d are arranged alternately in the switching liquid crystal unit 40. According to the arrangement, the left eye of the viewer 80 can view the left eye pixel region 30L of the display 30 but cannot view the right eye pixel region 30R. The switching liquid crystal unit 40 according to FIG. 6A and FIG. 6B is a fixed switching liquid crystal; and the light-shielding region 40c and the light-transmitting region 40d are fixed. The display 30 changes the position of the left eye pixel region 30L and the position of the right eye pixel region 30R of the display 30 according to the movement of the viewer 80.

FIG. 6B shows the state in which the left eye of the viewer 80 has moved in the direction of the arrow 81 in the drawing due to the movement of the viewer 80. In such a case, the positions of the images displayed in the display 30 are controlled so that the left eye of the viewer 80 can view the left eye pixel region 30L of the display 30. That is, in FIG. 6A, the left eye pixel region 30L is moved one pixel to the left in the drawing; and the right eye pixel region 30R is moved one pixel to the left in the drawing. Thereby, the left eye pixel region 30L shown in FIG. 6A moves to the position shown in FIG. 6B.

Figure 7A:
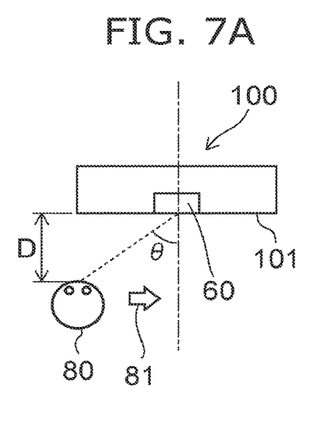
FIG. 7A to FIG. 7C are schematic views illustrating operations of the display device according to the first embodiment.
Figure 7B:
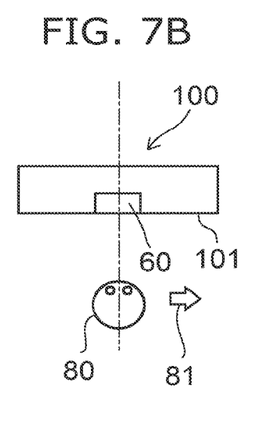
Figure 7C:
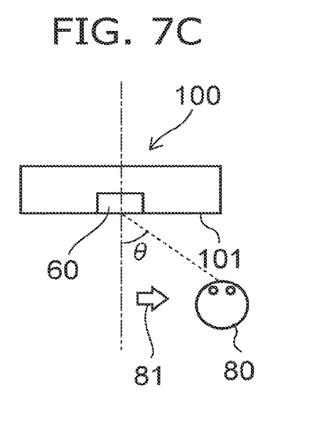

FIG. 7A to FIG. 7C are schematic views illustrating operations of the display device according to the first embodiment.

These drawings illustrate states of the viewer moving with respect to the display device 100.

The imaging unit 60 is provided at a prescribed position of the display device 100. A distance D is the distance between the viewer 80 and a display screen 101 of the display device 100. The viewer 80 moves in a direction (the direction of the arrow 81 in the drawing) horizontal with respect to the display screen 101 of the display device 100 while being separated from the display screen 101 by the distance D. For example, the angle between the viewer 80 and the normal of the display screen 101 at a reference point of the display screen 101 of the display device 100 may be used as the position of the viewer 80. For example, the reference point of the display screen 101 is the horizontal and vertical-direction center of the display screen 101.

The imaging unit 60 images the image of the viewer 80. Based on the image of the viewer 80 that is imaged by the imaging unit 60, the controller 50 calculates the position which is a viewing angle θ recited above, the distance from the display screen 101 recited above, etc. The controller 50 switches the light-shielding regions and the light-transmitting regions formed by the multiple optical elements included in the switching liquid crystal unit 40 according to the change of the viewing angle θ (the position) of the viewer 80. The switching liquid crystal unit 40 may be controlled to be optimal for the viewing angle θ (the position) of the eye for each eye by calculating the position of the center between the eyes, the positions of the left and right eyes, etc.

Figure 8:
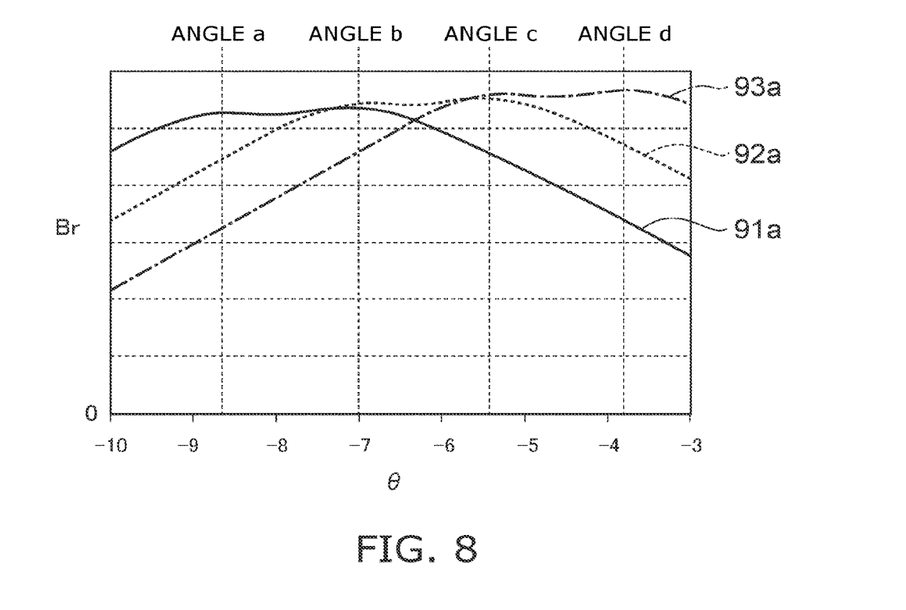
FIG. 8 illustrates an example of luminance characteristics of the display device according to the first embodiment.

FIG. 8 illustrates an example of luminance characteristics of the display device according to the first embodiment.

FIG. 8 shows the luminance characteristics for the aperture patterns of the switching liquid crystal unit 40 for one eye. Or, luminance profiles are shown in which the image for one eye is a white display and the image for the other eye is a black display.

In the figure, the horizontal axis is the viewing angle θ; and the vertical axis is a luminance Br.

As described above, the viewing angle θ is the angle between the viewer 80 and the normal line of the display screen 101 at the reference point of the display screen 101. The numerical values on the horizontal axis of FIG. 8 are shown as one example, and are not limited to this. The luminance Br is the screen luminance (hereinbelow, called simply the luminance) viewed by the viewer 80 when the left eye image (or the right eye image) is displayed in the display screen 101.

In FIG. 8, a first luminance characteristic 91a shows the relationship between the viewing angle θ of the viewer 80 and the luminance Br as viewed by the viewer 80 for a prescribed first aperture portion of the switching liquid crystal unit 40. A second luminance characteristic 92a shows the relationship between the viewing angle θ of the viewer 80 and the luminance Br as viewed by the viewer 80 for a second aperture portion adjacent to the prescribed first aperture portion. A third luminance characteristic 93a shows the relationship between the viewing angle θ of the viewer 80 and the luminance Br as viewed by the viewer 80 for a third aperture portion adjacent to the second aperture portion.

When the viewing angle θ of the viewer 80 is an angle a to an angle b, the switching liquid crystal unit 40 causes the prescribed first aperture portion to be in the light-transmitting state and the regions other than the first aperture portion to be in the light-shielding state. For the angle b to an angle c, the switching liquid crystal unit 40 causes the second aperture portion to be in the light-transmitting state and the regions other than the second aperture portion to be in the light-shielding state. For the angle c to an angle d, the switching liquid crystal unit 40 causes the third aperture portion to be in the light-transmitting state and the regions other than the third aperture portion to be in the light-shielding state. That is, the aperture portion of the switching liquid crystal unit 40 is determined according to the viewing angle θ of the viewer 80.

In the tracking control, the change (the movement) of the position of the viewer 80 is detected; and a control is performed to provide the optimal aperture pattern. The optimal aperture pattern is the aperture pattern where the luminance of the right eye pixel viewed by the right eye of the viewer 80 is substantially a maximum and the luminance of the left eye pixel viewed by the left eye of the viewer 80 is substantially a maximum. It was found by investigations of the inventor of the application that the display is difficult to view when the tracking control is inappropriate. For example, it was discovered that there are cases where the viewer 80 undesirably perceives a luminance change when the optical elements are switched according to the change (the movement) of the position of the viewer 80. The visibility decreases when such a luminance change is perceived.

For example, when the position of the viewer 80 changes from the angle a to the angle d, some amount of time is necessary to calculate the angle (the position) of the viewer 80 based on the image of the viewer 80 acquired by the imaging unit 60 and switch the optical elements of the switching liquid crystal unit 40 to the optimal aperture portion. Therefore, there is a delay until the aperture portion optimal for the movement of the viewer 80 is switched to the light-transmitting state. Specifically, at the point in time when the viewer 80 is moving in the range from the angle b to the angle c, the third aperture portion of the switching liquid crystal unit 40 has not switched completely to the light-transmitting state; and the second aperture portion is still in the light-transmitting state. Subsequently, the aperture portion switches from the second aperture portion to the third aperture portion partway through the movement of the viewer 80 from the angle c to the angle d. Therefore, the luminance characteristic that is viewed by the viewer 80 is switched from the second luminance characteristic 92a to the third luminance characteristic 93a in the viewing area of the angle c to the angle d; and a large luminance change is undesirably perceived.

If the aperture portion can be switched from the first aperture portion to the second aperture portion at the point on time when the viewer 80 has just arrived at the positions of the angle b and the aperture portion can be switched from the second aperture portion to the third aperture portion at the point on time when the viewer 80 has just arrived at the position of the angle c, the luminance change when switching is smallest; and it is difficult for the viewer 80 to perceive the luminance change. However, according to the delay time of the switching of the optical elements of the switching liquid crystal unit 40, the movement velocity of the viewer 80, etc., there is a possibility that the aperture pattern is not switched to the optimal aperture pattern when the viewer 80 moves to the prescribed position; and subsequently, the viewer 80 undesirably perceives a large luminance change due to the switching to the optimal aperture pattern at the time when the viewer further moves from the prescribed position.

Figure 9A:
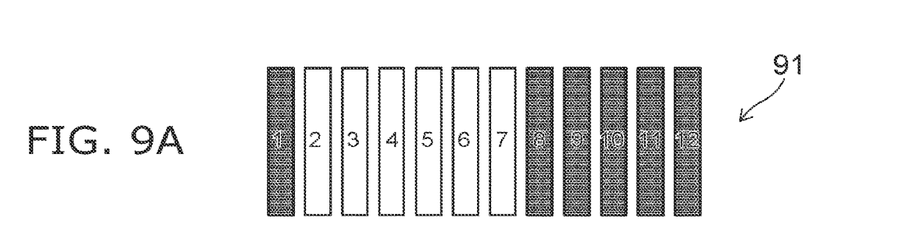
FIG. 9A to FIG. 9C are schematic views illustrating aperture patterns of the display device according to the first embodiment.
Figure 9B:
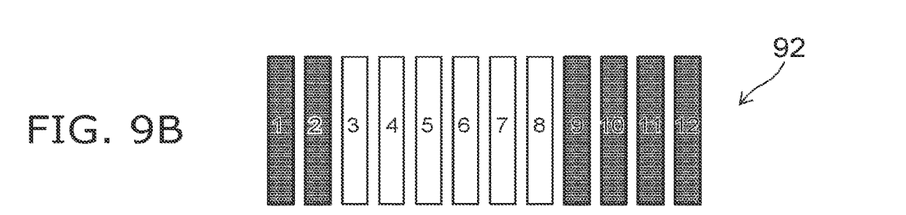
Figure 9C:
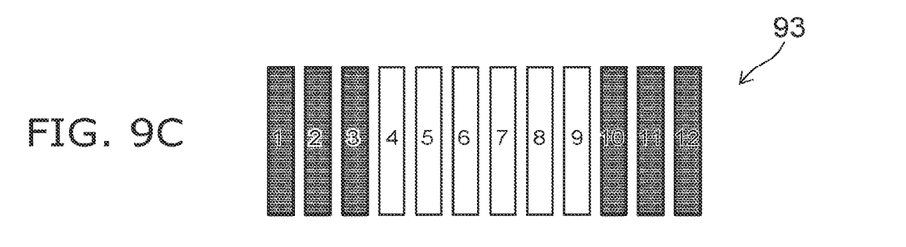

FIG. 9A to FIG. 9C are schematic views illustrating aperture patterns of the display device according to the first embodiment.

FIG. 9A to FIG. 9C show aperture patterns formed by the light-shielding regions and the light-transmitting regions of the switching liquid crystal unit 40. The aperture portion of the switching liquid crystal unit 40 is the light-transmitting region.

In the switching liquid crystal unit 40, for example, the three aperture patterns shown in FIG. 9A, FIG. 9B, and FIG. 9C are preset according to the viewing angle θ. Each of the three aperture patterns is set by whether or not a prescribed voltage is applied to each of the multiple optical elements included in the switching liquid crystal unit 40. The setting values may be stored in the memory 15 as a data table for each aperture pattern. The state is switched to the light-transmitting state when the setting value is for voltage application (ON); and the state is switched to the light-shielding state when the setting value is for non voltage application (OFF). The state may be the light-shielding state when the setting value is for voltage application (ON); and the state may be the light-transmitting state when the setting value is for non voltage application (OFF).

In the switching liquid crystal unit 40, for example, twelve optical elements 1 to 12 are arranged in one direction (from left to right in the drawings) in the order of the optical elements 1, 2, 3, . . . , 12. The number of optical elements is not limited thereto. In the example, the optical element 1 is a first optical element. The optical element 2 is a second optical element. The optical element 3 is a third optical element. The optical element 4 is a fourth optical element.

For the optical elements 1 to 12 of a first aperture pattern 91 of FIG. 9A, the optical element 1 is switched to the light-shielding state; the optical elements 2 to 7 are switched to the light-transmitting state; and the optical elements 8 to 12 are switched to the light-shielding state.

For the optical elements 1 to 12 of a second aperture pattern 92 of FIG. 9B, the optical element 1 and the optical element 2 are switched to the light-shielding state; the optical elements 3 to 8 are switched to the light-transmitting state; and the optical elements 9 to 12 are switched to the light-shielding state.

For the optical elements 1 to 12 of a third aperture pattern 93 of FIG. 9C, the optical elements 1 to 3 are switched to the light-shielding state; the optical elements 4 to 9 are switched to the light-transmitting state; and the optical elements 10 to 12 are switched to the light-shielding state.

Figure 10:
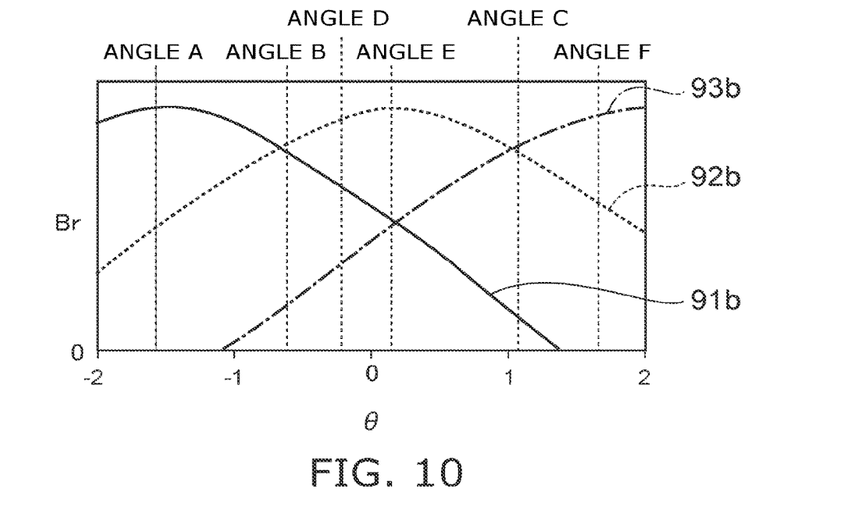
FIG. 10 illustrates another example of luminance characteristics of the display device according to the first embodiment.

FIG. 10 illustrates another example of luminance characteristics of the display device according to the first embodiment.

FIG. 10 shows luminance characteristics corresponding to the aperture patterns of FIGS. 9A to 9C of the switching liquid crystal unit 40.

In the figure, the horizontal axis is the viewing angle θ; and the vertical axis is the luminance Br as viewed by the viewer.

The viewer 80 moves from an angle A toward an angle F. A first luminance characteristic 91b illustrates the relationship between the viewing angle θ and the luminance Br for the first aperture pattern 91 of FIG. 9A. A second luminance characteristic 92b illustrates the relationship between the viewing angle θ and the luminance Br for the second aperture pattern 92 of FIG. 9B. A third luminance characteristic 93b illustrates the relationship between the viewing angle θ and the luminance Br for the third aperture pattern 93 of FIG. 9C.

Here, the change of the luminance does not occur when viewed by the viewer 80 if the luminance characteristic is switched from the first luminance characteristic 91b to the second luminance characteristic 92b at the point on time when the viewer 80 just arrives at the angle B (a second angle) while the viewer is moving from the angle A (a first angle) toward an angle D (a fourth angle). However, if the switching operation from the first aperture pattern 91 to the second aperture pattern 92 is started at the point on time when it is determined that the viewer 80 has just arrived at the position of the angle B by analyzing the image that is imaged by the imaging unit 60, there are cases where the switching cannot be performed quickly at the timing of the angle B due to the delay time due to calculations by the system for the imaging through the image analysis, the response rate of the liquid crystal, etc. In other words, the switching from the first aperture pattern 91 to the second aperture pattern 92 is completed after the delay time due to the calculations by the system, the response rate of the liquid crystal, etc. In this case the switching from the first aperture pattern 91 to the second aperture pattern 92 is completed when the viewer 80 moves to a position distal to the angle B in the direction of the angle D. For example, if the aperture pattern is switched from the first aperture pattern 91 to the second aperture pattern 92 when the viewer 80 has moved to the position of the angle D, the difference between the luminance due to the first luminance characteristic 91b and the luminance due to the second luminance characteristic 92b at the position of the angle D is perceived as a luminance change. As the position of the viewer 80 moves away from the angle B (the second angle), the difference between the first luminance characteristic 91b and the second luminance characteristic 92b becomes large; and the change of the luminance that is perceived by the viewer 80 becomes large.

Therefore, the controller 50 performs the control so that, when the position of the viewer 80 moves from the angle A (the first angle) to the angle D (the fourth angle), the switching from the first aperture pattern 91 to the second aperture pattern 92 is completed at the timing of the position of the viewer 80 arriving at the angle B (the second angle). At the position of the angle B as shown in FIG. 10, the viewer 80 does not perceive the change of the luminance because the luminance is substantially equal between the first luminance characteristic 91b and the second luminance characteristic 92b. However, if the switching from the first aperture pattern 91 to the second aperture pattern 92 is started after the controller 50 determines that the viewer 80 has arrived at the angle B (the second angle), for example, the viewer 80 may have already moved to the vicinity of the location of the angle D when the aperture pattern is switched due to the delay time due to the alignment speed of the liquid crystal molecules, the delay time of the system, etc. At this time, the difference between the luminance due to the first aperture pattern 91 and the luminance due to the second aperture pattern 92 as viewed by the viewer 80 is large; and the viewer 80 perceives the change of the luminance.

Accordingly, when the viewer 80 moves from the angle A (the first angle) in the direction of the angle D (the fourth angle), the switching from the first aperture pattern 91 to the second aperture pattern 92 is set to start before the viewer 80 reaches the position of the angle B (the second angle). Thereby, the timing of the actual completion of the switching is set to be at a position more proximal to the angle B (the second angle) than to the angle D (the fourth angle); and it is possible to reduce the change of the luminance viewed when switching.

When the viewer 80 moves from the angle F (a sixth angle) in the direction of the angle E (a fifth angle), the switching from the third aperture pattern 93 to the second aperture pattern 92 is set to start before the viewer 80 reaches the angle C (a third angle). Thereby, the timing of the completion of the switching is at the vicinity of the angle C; and similarly, it is possible to reduce the change of the luminance viewed at the point in time when the switching is completed.

For example, the determination of whether the viewer 80 is moving from the angle A (the first angle) in the direction of the angle D (the fourth angle) or moving from the angle F (the sixth angle) in the direction of the angle E (the fifth angle) is implemented as follows.

The imaging unit 60 images the viewer 80 at the timing of a prescribed time period. The controller 50 calculates the movement direction of the viewer 80 by calculating the angle (the position) of the viewer 80 at each time of the imaging by the imaging unit 60.

The controller 50 calculates the position at the current point in time based on the positional information of the viewer 80 at each time of the imaging by the imaging unit 60; and when the viewer 80 is moving from the angle A (the first angle) in the direction of the angle D (the fourth angle), the controller 50 starts the switching from the first aperture pattern 91 to the second aperture pattern 92 when it is determined that the viewer 80 has moved to a prescribed position before the viewer 80 reaches the angle B (the second angle). When the viewer 80 is moving from the angle F in the direction of the angle E (the fifth angle), the switching from the third aperture pattern 93 to the second aperture pattern 92 is started when it is determined that the viewer 80 has moved to a prescribed position before the viewer 80 reaches the angle C (the third angle).

The prescribed position where the switching of the aperture pattern is started is preset in the controller 50, the memory 15, etc.

For example, the processing recited below is implemented to switch the aperture pattern with higher precision.

The imaging unit 60 images the viewer 80 at the timing of a prescribed spacing. The controller 50 calculates the movement direction, the movement velocity, and the angle at the current point in time (the positional information) of the viewer 80 by acquiring the angle (the position) of the viewer 80 at each time of the imaging by the imaging unit 60. The total of the delay time due to the alignment speed of the liquid crystal molecules, the delay time of the system, etc., is stored as the delay time information in the controller 50, the memory 15, etc. If the alignment speed of the liquid crystal molecules can be ignored compared to the delay time of the system, the delay time information may be set to be the delay time of the system.

When the viewer 80 is moving from the angle A (the first angle) in the direction of the angle D (the fourth angle), the controller 50 calculates, based on the movement velocity and the delay time information, the timing (the position of the viewer 80 or the time) to start the switching from the first aperture pattern 91 to the second aperture pattern 92 so that the switching of the aperture pattern is completed at the point substantially on time when the viewer 80 moves to the angle B. In other words, the calculation of the switching start point (the position of the viewer 80 or the time of starting the switching) is executed. By the controller 50 starting the switching operation from the first aperture pattern 91 to the second aperture pattern 92 at the calculated switching start point, the switching of the aperture pattern is completed substantially at the point on time when the viewer 80 moves to the position of the angle B (the second angle).

Similarly, when the viewer 80 is moving from the angle F (the sixth angle) in the direction of the angle E (the fifth angle), based on the movement velocity and the delay time information, the controller 50 calculates the timing to start the switching from the third aperture pattern 93 to the second aperture pattern 92 so that the switching of the aperture pattern is completed at the point substantially on time when the viewer 80 has arrived at the angle C. By the controller 50 starting the switching operation from the third aperture pattern 93 to the second aperture pattern 92 at the calculated switching start point, the switching of the aperture pattern is completed at substantially the point on time when the viewer 80 has moved to the position of the angle C (the third angle).

The prescribed timing of the imaging unit 60 imaging the viewer 80 may be at the timing of every frame, the timing of once for multiple frames, or multiple imaging for each frame, and may be appropriately set according to the characteristics of the system. The movement velocity of the viewer 80 is calculated from the position of the viewer 80 imaged at each timing; the position of the viewer 80 at each time is calculated; and the control of the switching liquid crystal unit 40 can be performed at the optimal timing.

The optimal switching position of the switching from the first aperture pattern 91 to the second aperture pattern 92 is the angle B (the second angle), the optimal switching position of the switching from the second aperture pattern 92 to the third aperture pattern 93 is the angle C (the third angle), and the optimal switching position of the switching from the first aperture pattern 91 to the third aperture pattern 93 is the angle E, where the optimal switching position is the position of the viewer 80 where the change of the luminance viewed by the viewer 80 is substantially a minimum in the switching of the aperture pattern.

Figure 11:
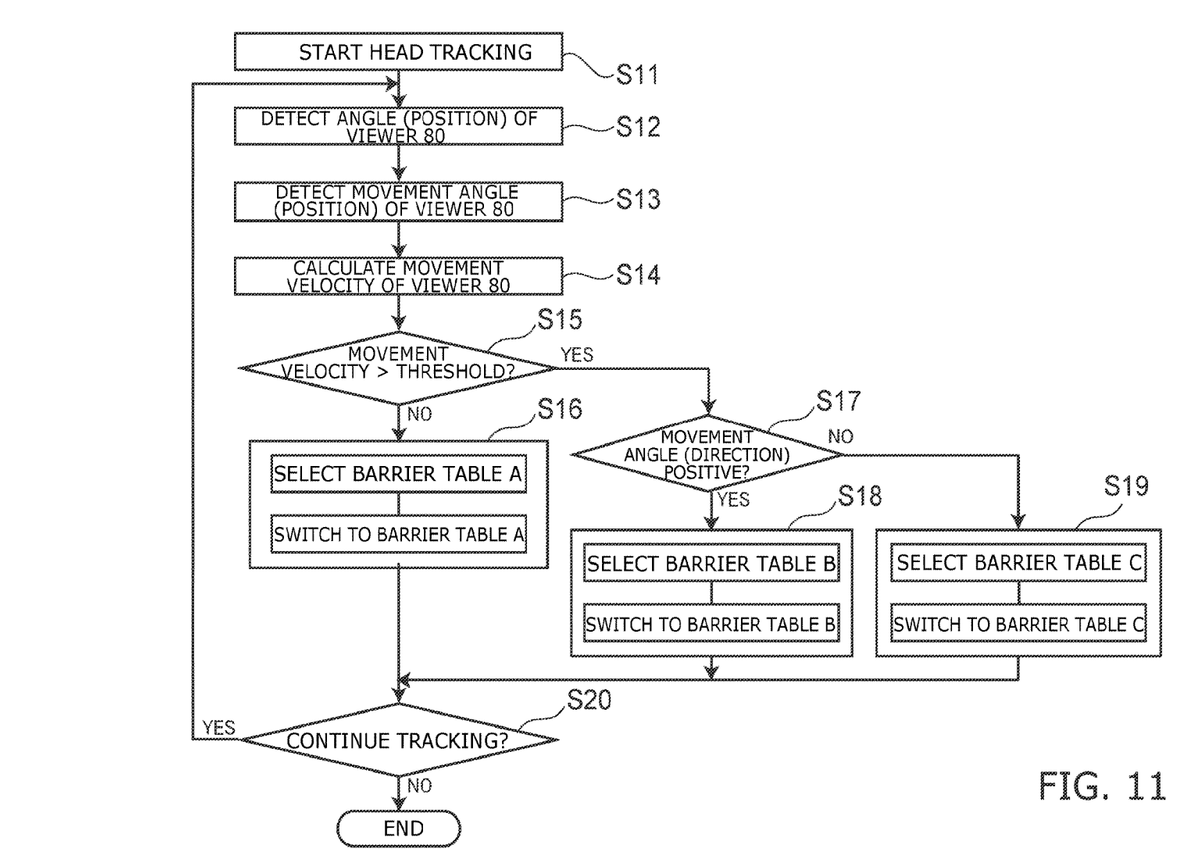
FIG. 11 is a flowchart illustrating operations of the display device according to the first embodiment.

FIG. 11 is a flowchart illustrating operations of the display device according to the first embodiment. The flow of FIG. 11 illustrates the head tracking 3D operation for a stereoscopic display.

The aperture pattern of the switching liquid crystal unit 40 is stored as multiple tables for each pattern.

When the controller 50 of the display device 100 receives a signal to start the head tracking 3D operation, the controller 50 starts the head tracking 3D operation (step S11).

The controller 50 detects the angle (the position) of the viewer 80 based on the image of the viewer 80 imaged by the imaging unit 60 (step S12).

The controller 50 detects the movement angle (the position) from the image that is imaged at the next timing of the imaging in step S12 (step S13).

The controller 50 calculates the movement velocity of the viewer 80 based on the imaging timing and the movement position (step S14). The timing of the imaging may be the timing of each frame or at the unit of multiple frames; or the timing of multiple imaging may be provided inside one frame.

The controller 50 determines whether the movement velocity of the viewer 80 is faster or slower than a threshold (a prescribed movement velocity) (step S15). In the case where it is determined that the movement velocity of the viewer 80 is slower than the threshold (in the case of NO), the optimal barrier table A that corresponds to the position and the movement velocity of the viewer 80 is selected; and the switching to the aperture pattern corresponding to the barrier table A is started at the point substantially on time when it is determined that the viewer 80 has arrived at the angle B (the second angle) or the angle C (the third angle) (step S16). When the switching to the aperture pattern corresponding to the barrier table A is completed, the flow proceeds to step S20.

In the case where the controller 50 determines that the movement velocity of the viewer 80 is faster than the threshold in step S15 (in the case of YES), the flow proceeds to step S17; and the positive/negative determination of the movement direction is implemented. The controller 50 determines whether the movement angle (the direction) of the viewer 80 is in the positive direction or the negative direction (step S17). In the case where the positive direction is determined (in the case of YES), the optimal barrier table B corresponding to the movement direction and the movement velocity is selected; and as described above, the switching to the aperture pattern corresponding to the barrier table B is performed beforehand based on the delay time information so that the luminance change is substantially a minimum when the viewer 80 has arrived at the angle B (the second angle) or the angle C (the third angle) (step S18). In the case where the negative direction is determined in step S17 (in the case of NO), the barrier table C that is selected has the aperture position optimal for the opposite direction of the barrier table B from the barrier table A; and as described above, the switching to the aperture pattern corresponding to the barrier table C is performed beforehand based on the delay time information so that the luminance change is substantially a minimum when the viewer 80 has arrived at the angle C (the third angle) or the angle B (the second angle) (step S19).

When the switching to the aperture pattern corresponding to the barrier table B or the barrier table C is completed in step S18 or step S19, the flow proceeds to step S20. Although the positive or negative direction is appropriately set according to the system, the direction from the angle F toward the angle A is used as the negative direction in the case where the direction from the angle A toward the angle F is used as the positive direction in FIG. 10.

In step S20, when the optimal table is selected from the multiple tables, the controller 50 determines whether or not to continue the head tracking 3D operation; and in the case where the continuation is determined to be unnecessary (in the case of NO), the head tracking 3D operation is ended. In the case where the continuation is determined to be necessary in step S20 (in the case of YES), the flow returns to step S12. The determination of whether the continuation is necessary or unnecessary may be determined by the existence or absence of the signal to start the head tracking 3D operation; or other various conditions may be set and the determination may be performed based on the conditions. The point of starting the switching described above may be set by presetting the switching start times or the positions of the viewer 80 corresponding to the movement velocity of the viewer 80 in a table, etc.

The switching liquid crystal unit 40 is not limited to a parallax barrier; and the switching of the right eye pixel region and the left eye pixel region may be implemented using a lenticular lens, etc. In such a case as well, when the viewer 80 moves, the start of the switching of the lenticular lens similarly is implemented beforehand so that the luminance difference of the image is a minimum before and after the switching by considering the delay time of the system, the alignment speed of the liquid crystal, etc. In the case where the alignment speed of the liquid crystal can be ignored compared to the delay time of the system, only the delay time of the system may be used as the delay time information.

Second Embodiment

The case where the optimal switching cannot be performed according to the position of the viewer 80 even when the controller 50 starts the switching of the aperture pattern will now be considered. The configuration of the display device in such a case is similar to that of the first embodiment. The description refers to FIGS. 9A to 9C and FIG. 10 described above.

For example, when the viewer 80 is moving from the angle A (the first angle) in the direction of the angle D (the fourth angle) as shown in FIG. 10, there are cases where the movement velocity of the viewer 80 is too fast; and the switching cannot be not completed at the point substantially on time when the viewer 80 has moved to the angle B (the second angle) even when the aperture pattern is switched from the first aperture pattern 91 to the second aperture pattern 92 at some position between the angle A (the first angle) and the angle B. By considering such a case, the controller 50 may execute the following control.

Based on the movement velocity of the viewer 80 calculated from the positional information of the viewer 80 at each time of the imaging by the imaging unit 60, it is determined whether or not it is possible to complete the switching to the second aperture pattern 92 at the point in time when the viewer 80 has moved to the angle B (the second angle). In the case where the switching is determined to be impossible, the controller 50 starts the switching from the first aperture pattern 91 to the third aperture pattern 93 to complete the switching from the first aperture pattern 91 to the third aperture pattern 93 at the point substantially on time when the viewer 80 has arrived at the angle E (the fifth angle) based on the delay time information from the movement velocity of the viewer 80, the delay time of the system, the alignment speed of the liquid crystal, etc. In the case where the alignment speed of the liquid crystal can be ignored compared to the delay time, only the delay time of the system may be used as the delay time information. The switching start point at this time is a position such that the switching is completed at the point substantially on time when the viewer 80 has moved to the angle E (the fifth angle). Here, although both the luminances of the first luminance characteristic 91*b* of the first aperture pattern 91 and the third luminance characteristic 93*b* of the third aperture pattern 93 at the angle E (the fifth angle) are lower than the luminance at the angle B (the second angle), the luminance difference is a small luminance difference in a range that the viewer 80 does not perceive as a change of the luminance.

Similarly, when the viewer 80 is moving from the angle F (the sixth angle) in the direction of the angle E (the fifth angle), the movement velocity of the viewer 80 is calculated from the positional information of the viewer 80 at each time of the imaging by the imaging unit 60; and it is determined whether or not it is possible to complete the switching from the third aperture pattern 93 to the second aperture pattern 92 when the position of the viewer 80 has arrived at the angle C (the third angle) from the angle F (the sixth angle). In the case where the switching is determined to be impossible, the controller 50 calculates the switching start point so that the switching from the third aperture pattern 93 to the first aperture pattern 91 is completed at the point on time when the viewer 80 has arrived at the angle E (the fifth angle); and the controller 50 starts the switching at the calculated switching start point.

The point of starting the switching may be set by presetting the switching start times or the positions of the viewer 80 corresponding to the movement velocity of the viewer 80 in a table, etc.

Third Embodiment

In the first embodiment and the second embodiment as described above, when performing the stereoscopic display, the luminance difference in the switching is difficult for the viewer 80 to perceive by optimally switching the light-transmitting regions and the light-shielding regions of the switching liquid crystal unit 40 based on the position or the position and movement velocity of the viewer 80. Conversely, the positions of the right eye pixel regions and the left eye pixel regions of the display 30 may be changed according to the position or the position and movement velocity of the viewer 80 without switching the aperture pattern of the switching liquid crystal unit 40. Although the configuration of the display device in such a case is similar to that of the first embodiment, as shown in FIGS. 6A and 6B, the aperture pattern of the switching liquid crystal unit 40 is fixed and the positions of the display images are switched. Specifically, when the viewer 80 moves, the switching of the right eye pixel region 30R and the left eye pixel region 30L is started beforehand so that the luminance difference of the image as viewed by the viewer 80 before and after the switching is substantially a minimum by similarly considering the delay time of the system, the alignment speed of the liquid crystal, etc.

For example, the controller 50 acquires the positional information relating to the position of the viewer 80 and controls the display image pattern of the right eye image and the left eye image based on the positional information. The display image pattern is switched from the first display image pattern to the second display image pattern to cause the right eye of the viewer 80 to continuously view the right eye image and cause the left eye of the viewer 80 to continuously view the left eye image when the viewer 80 moves with respect to the display 30. The switching operation is started before the viewer 80 arrives at the optimal switching position, where the optimal switching position is the position of the viewer 80 where the luminance viewed from the display image pattern is substantially equal between the first display image pattern and the second display image pattern.

The controller 50 has delay time information based on the delay time of the system, the alignment speed of the liquid crystal, etc., from the start of the switching from the first display image pattern to the second display image pattern to the completion of the switching. The movement velocity of the viewer 80 is calculated based on the positional information of the viewer 80 acquired at a prescribed timing; and based on the movement velocity of the viewer 80 and the delay time information, it is possible to execute the switching operation with high precision by starting the switching so that the switching of the display image pattern is completed by when the viewer 80 arrives at the optimal switching position.

When the controller 50 determines that the movement velocity of the viewer 80 is too fast and the switching from the first display image pattern to the second display image pattern cannot be completed by when the viewer 80 moves to the optimal switching position, the switching is performed from the first display image pattern to the third display image pattern, where the third display image pattern is in the reverse direction of the first display image pattern from the second display image pattern. At this time, the switching is started so that the switching is completed at a position so that the difference of the luminance due to the first display image pattern and the luminance due to the third display image pattern as viewed by the viewer 80 is substantially a minimum. For the position of starting the switching, the delay time information that is used is based on the delay time of the system, the alignment speed of the liquid crystal, etc., from the switching start from the first display image pattern to the third display image pattern to the completion of the switching. The movement velocity of the viewer 80 is calculated based on the positional information of the viewer 80 acquired at a prescribed timing; and based on the movement velocity of the viewer 80 and the delay time information, it is possible to execute the switching operation with high precision by starting the switching so that the switching is completed when the viewer 80 has moved to the optimal switching position.

In the case where the alignment speed of the liquid crystal can be ignored compared to the delay time of the system, only the delay time of the system may be used as the delay time information.

Fourth Embodiment

The switching liquid crystal unit 40 is not limited to a parallax barrier; and a lenticular lens, etc., may be used. For example, switching of the refraction direction of the lenticular lens is performed by the switching liquid crystal unit 40 so that the right eye of the viewer 80 continuously views the right eye pixel region and the left eye of the viewer 80 continuously views the left eye pixel region. In such a case as well, when the viewer 80 moves, the switching of the lenticular lens is started beforehand so that the luminance difference of the image before and after the switching is a minimum by similarly considering the delay time of the system, the alignment speed of the liquid crystal, etc.

Or, the refraction direction of the lenticular lens may be fixed; and similarly to the third embodiment, the switching of the display image pattern may be controlled. The switching operation of the display image pattern in such a case is similar to that of the third embodiment.

In the case where the alignment speed of the liquid crystal can be ignored compared to the delay time of the system, only the delay time of the system may be used as the delay time information.

A flow of the head tracking 3D operation for the stereoscopic display such as that shown in FIG. 11 is applicable also in the case where the head tracking 3D display is executed by changing the positions of the images using a parallax barrier in a fixed switching liquid crystal as recited above and in the case where a lenticular lens is used as the fixed switching liquid crystal as recited above.

In the case where the head tracking 3D display is performed by changing the positions of the images using the fixed switching liquid crystal, multiple barrier tables are used as multiple image display patterns; and otherwise, the flow is similar to the flow of FIG. 11.

Fifth Embodiment

Figure 12:
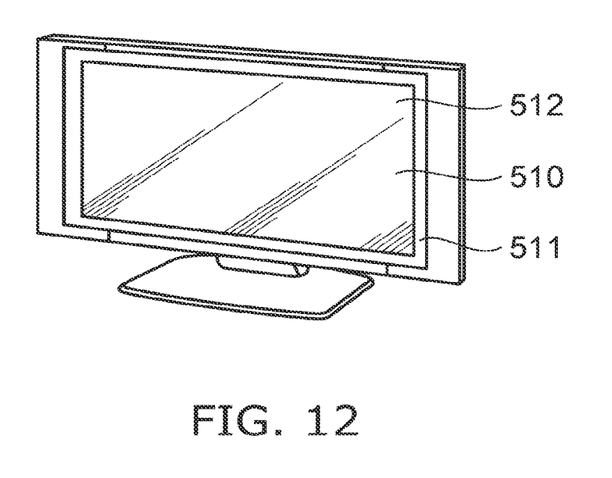
FIG. 12 is a schematic view illustrating an electronic device according to a fifth embodiment.

FIG. 12 is a schematic view illustrating an electronic device according to a fifth embodiment.

The display device of the embodiments described above is provided in the electronic device. The electronic device is illustrated as a liquid crystal display. The liquid crystal display includes an image display screen unit 510, a front panel 511, and filter glass 512.

Such liquid crystal displays are used in instrument panels of automobiles, car navigation, digital cameras, mobile telephones, smartphones, personal computers, etc.

According to the embodiments, an easily-viewable display device and electronic device can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in display devices such as switching liquid crystal units, displays, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all display devices and electronic devices practicable by an appropriate design modification by one skilled in the art based on the display devices and electronic devices described above as embodiments of the invention also are within the scope of the invention to the extent that the spirit of the invention is included.

Various variations and modifications can be conceived by those skilled in the art within the spirit of the invention, and it is understood that such variations and modifications are also encompassed within the scope of the invention.

For example, any addition, deletion, or design change of components, or any addition, omission, or condition change of processes in the above embodiments suitably made by those skilled in the art are also encompassed within the scope of the invention as long as they fall within the spirit of the invention.

Other working-effects derived from aspects described in the embodiments are interpreted to be naturally due to the invention as long as they are clear from the specification description or could have appropriately been made by a person skilled in the art.

What is claimed is:

1. A display device, comprising:
   a switching liquid crystal unit configured to switch an aperture pattern by a plurality of optical elements, the aperture pattern including an aperture portion and a light-shield portion, the aperture portion being in a light-transmitting state, a transmittance of the light-shield portion being lower than a transmittance in the light-transmitting state;
   a display configured to overlap the switching liquid crystal unit and being configured to display parallax images including a right eye image and a left eye image; and
   a controller configured to acquire positional information relating to a position of a viewer and control a position of the aperture pattern based on the positional information,
   wherein the controller switches the aperture pattern from a first aperture pattern state to a second aperture pattern state so that a right eye of the viewer always views the right eye image and a left eye of the viewer always views the left eye image when the viewer moves with respect to the display in a direction from a first position to a second position,
   the controller starts the switching before the viewer reaches a switching position between the first position and the second position,
   a first luminance value at the first position in the first aperture pattern state is higher than a second luminance value at the second position in the first aperture pattern state,
   a third luminance value at the switching position in the first aperture pattern state is between the first luminance value and the second luminance value,
   a fourth luminance value at the first position in the second aperture pattern state is lower than a fifth luminance value at the second position in the second aperture pattern state,
   a sixth luminance value at the switching position in the second aperture pattern state is between the fourth luminance value and the fifth luminance value, and
   the third luminance value is substantially same as the sixth luminance value.

2. The device according to claim 1, wherein
   the controller has delay time information of a delay time from the start of the switching from the first aperture pattern state to the second aperture pattern state to the completion of the switching,
   the controller calculates a movement velocity of the viewer based on the positional information of the viewer acquired at a prescribed timing, and
   the controller starts the switching of the aperture pattern to cause the switching to be completed by when the viewer reaches the switching position.

3. The device according to claim 2, wherein the controller performs the switching to a third aperture pattern state when determining that the switching from the first aperture pattern state to the second aperture pattern state cannot be completed by when the viewer reaches to the switching position,
   the aperture pattern in the first aperture pattern state includes a first region not overlapping the aperture pattern in the second aperture pattern state,
   the aperture pattern in the third aperture pattern state includes a second region not overlapping the aperture pattern in the second aperture pattern state, and
   the aperture pattern in the second aperture pattern state is between the first region and the second region.

4. The device according to claim 3, wherein
   a seventh luminance value at a third position in the third aperture pattern state is lower than an eighth luminance value at a fourth position in the third aperture pattern state,
   a ninth luminance value at the third position in the first aperture pattern is same as the seventh luminance value, and
   the second position is between the first position and the fourth position in the direction, the third position is between the second position and the fourth position in the direction.

5. A display device, comprising:
   a switching liquid crystal unit configured to switch a display image pattern by a plurality of optical elements, the display image pattern including an aperture portion and a light-shielding portion, the aperture portion being in a light-transmitting state, a transmittance of the light-shielding portion being lower than a transmittance in the light-transmitting state;
   a display configured to overlap the switching liquid-crystal unit and being configured to display parallax images including a right eye image and a left eye image; and
   a controller configured to acquire positional information relating to a position of a viewer and control the display image pattern of the right eye image and the left eye image based on the positional information,
wherein the controller switches the display image pattern from a first display image pattern state to a second display image pattern state so that a right eye of the viewer always views the right eye image and a left eye of the viewer always views the left eye image when the viewer moves with respect to the display in a direction from a first position to a second position,
the controller starts the switching before the viewer reaches to a switching position between the first position and the second position,
a first luminance value at the first position in the first display image pattern state is higher than a second luminance value at the second position in the first display image pattern state,
a third luminance value at the switching position in the first display image pattern state is between the first luminance value and the second luminance value,
a fourth luminance value at the first position in the second display image pattern state is lower than a fifth luminance value at the second position in the second display image pattern state,
a sixth luminance value at the switching position in the second display image pattern state is between the fourth luminance value and the fifth luminance value, and
the third luminance value is substantially same as the sixth luminance value.

6. The device according to claim 5, wherein
the controller has delay time information of a delay time from the start of the switching from the first display image pattern state to the second display image pattern state to the completion of the switching,
the controller calculates a movement velocity of the viewer based on the positional information of the viewer acquired at a prescribed timing, and
the controller starts the switching of the aperture pattern to cause the switching to be completed by when the viewer reaches the switching position.

7. The device according to claim 6, wherein the controller performs the switching to a third display image pattern state when determining that the switching from the first display image pattern state to the second display image pattern state cannot be completed by when the viewer reaches to the switching position
the display image pattern in the first display image pattern state includes a first region not overlapping the display image pattern in the second display image pattern state,
the display image pattern in the third display image pattern state includes a second region not overlapping the display image pattern in the second display image pattern state, and
the display image pattern in the second display image pattern state is between the first region and the second region.

8. The device according to claim 7, wherein
a seventh luminance value at a third position in the third display image pattern state is lower than an eighth luminance value at a fourth position in the third display image pattern state,
a ninth luminance value at the third position in the first display image pattern is same as the seventh luminance value, and
the second position is between the first position and the fourth position in the direction, the third position is between the second position and the fourth position in the direction.

9. An electronic device, comprising:
a display device, the display device including
a switching liquid crystal unit configured to switch an aperture pattern by a plurality of optical elements, the aperture pattern including an aperture portion and a light-shielding portion, the aperture portion being in a light-transmitting state, a transmittance of the light-shielding portion being lower than a transmittance in the light-transmitting state,
a display configured to overlap the switching liquid displaying parallax images including a right eye image and a left eye image, the display and the switching liquid crystal unit overlapping, and
a controller configured to acquire positional information relating to a position of a viewer and control a position of the aperture pattern based on the positional information,
wherein the controller switches the aperture pattern from a first aperture pattern state to a second aperture pattern state so that a right eye of the viewer always views the right eye image and a left eye of the viewer always views the left eye image when the viewer moves with respect to the display in a direction from a first position to a second position,
the controller starts the switching before the viewer reaches a switching position between the first position and the second position,
a first luminance value at the first position in the first aperture pattern state is higher than a second luminance value at the second position in the first aperture pattern state,
a third luminance value at the switching position in the first aperture pattern state is between the first luminance value and the second luminance value,
a fourth luminance value at the first position in the second aperture pattern state is lower than a fifth luminance value at the second position in the second aperture pattern state,
a sixth luminance value at the switching position in the second aperture pattern state is between the fourth luminance value and the fifth luminance value, and
the third luminance value is substantially same as the sixth luminance value.

10. The electronic device according to claim 9, wherein
the controller has delay time information of a delay time from the start of the switching from the first aperture pattern state to the second aperture pattern state to the completion of the switching,
the controller calculates a movement velocity of the viewer based on the positional information of the viewer acquired at a prescribed timing, and
the controller starts the switching of the aperture pattern to cause the switching to be completed by when the viewer reaches the switching position.

11. The electronic device according to claim 10, wherein
the controller performs the switching to a third aperture pattern state when determining that the switching from the first aperture pattern state to the second aperture pattern state cannot be completed by when the viewer reaches to the switching position,
the aperture pattern in the first aperture pattern state includes a first region not overlapping the aperture pattern in the second aperture pattern state,
the aperture pattern in the third aperture pattern state includes a second region not overlapping the aperture pattern in the second aperture pattern state, and the aperture pattern in the second aperture pattern state is between the first region and the second region.

12. The device according to claim 11, wherein a seventh luminance value at a third position in the third aperture pattern state is lower than an eighth luminance value at a fourth position in the third aperture pattern state, a ninth luminance value at the third position in the first aperture pattern is same as the seventh luminance value, and the second position is between the first position and the fourth position in the direction, the third position is between the second position and the fourth position in the direction.

* * * * *